United States Patent
Pirš et al.

(10) Patent No.: US 7,132,133 B1
(45) Date of Patent: Nov. 7, 2006

(54) PROCESS FOR THE MANUFACTURING OF THE POLYMER COMPENSATION LAYER FOR LCD OPTICAL LIGHT SHUTTER AND THE CONSTRUCTION THEREOF

(75) Inventors: Janez Pirš, Ljubljana (SI); Silva Pirš, Ljubljana (SI); Bojan Marin, Ljubljana (SI); Robert Blinc, Ljubljana (SI); Martin Copic, Ljubljana (SI); Rok Petkovšek, Ljubljana (SI)

(73) Assignee: Institut Jozef Stefan, Ljubljana (SI)

( * ) Notice: Subject to any disclaimer, the term of this patent is extended or adjusted under 35 U.S.C. 154(b) by 0 days.

(21) Appl. No.: 10/018,049

(22) PCT Filed: Jun. 12, 2000

(86) PCT No.: PCT/SI00/00017

§ 371 (c)(1),
(2), (4) Date: Feb. 14, 2002

(87) PCT Pub. No.: WO00/77561

PCT Pub. Date: Dec. 21, 2000

(30) Foreign Application Priority Data

Jun. 15, 1999 (SI) .................................. 9900164

(51) Int. Cl.
*C08F 2/46* (2006.01)
*C08F 2/48* (2006.01)
*C08J 7/18* (2006.01)
*C08J 7/12* (2006.01)
*B05D 3/02* (2006.01)
*B05D 3/06* (2006.01)

(52) U.S. Cl. ....................... 427/492; 427/508; 427/162; 427/384

(58) Field of Classification Search ................ 427/492, 427/493, 508, 510, 512, 521, 522, 162, 163.1, 427/384, 385.5, 378.1
See application file for complete search history.

(56) References Cited

U.S. PATENT DOCUMENTS

| 4,259,407 | A | * | 3/1981 | Tada et al. ................... 428/421 |
| 4,983,335 | A | | 1/1991 | Matsuo et al. |
| 5,178,710 | A | | 1/1993 | Hikmet et al. |
| 5,178,933 | A | | 1/1993 | Yoshida et al. |
| 5,245,456 | A | | 9/1993 | Yoshimi et al. |
| 5,298,199 | A | | 3/1994 | Hirose et al. |
| 5,480,964 | A | | 1/1996 | Harris et al. |

(Continued)

FOREIGN PATENT DOCUMENTS

GB          758136         9/1956

*Primary Examiner*—Marianne Padgett
(74) *Attorney, Agent, or Firm*—Breiner & Breiner, LLC (57) ABSTRACT

This invention solves the technical problem of compensating for the angular dependence of the contrast in optical devices comprising liquid crystal displays (LC optical light shutters, which operate on the principle of electrically controlled optical birefringence), with the aid of a compensation layer exhibiting optically negative birefringence, which enables the angular compensation of the LC layer birefringence in the state in which the LC molecules are homeotropically aligned (typical optically positive birefringence). The process for the manufacture of the optically negatively birefringent compensation layer is devised on the controlled spontaneous deformation of the polymer molecules during the polymerization procedure. The manufacturing process is feasible by the employment of known and well-controllable technical procedures, and enables the mass production of compensation layers. The invention solves the problem of manufacturing a compensation layer exhibiting the required optically negative birefringence, as well as the construction/manufacturing of the optical light shutter, which utilizes such a compensation film.

5 Claims, 2 Drawing Sheets

U.S. PATENT DOCUMENTS

| | | | |
|---|---|---|---|
| 5,528,400 A * | 6/1996 | Arakawa | 349/117 |
| 5,646,703 A | 7/1997 | Kamada et al. | |
| 5,798,808 A | 8/1998 | Van Haaren et al. | |
| 5,986,734 A | 11/1999 | Winker et al. | |
| 5,998,556 A | 12/1999 | Kanto et al. | |
| 2005/0189516 A1 * | 9/2005 | Wellinghoff et al. | 252/299.67 |
| 2006/0043980 A1 * | 3/2006 | Verstegen et al. | 324/697 |

* cited by examiner

PROCESS FOR THE MANUFACTURING OF THE POLYMER COMPENSATION LAYER FOR LCD OPTICAL LIGHT SHUTTER AND THE CONSTRUCTION THEREOF

The object of the present invention is a process for the manufacture of optically negatively birefringent compensation layers, based on the controlled spontaneous deformation of the polymer macromolecules during the polymerization process, as well as the construction of an optical light shutter utilizing such a compensation layer.

The technical field, dealing with this invention, is the compensating for the angular dependence of the intensity of the transmitted light in optical apparatus equipped with liquid crystal light shutters. In the following text, the liquid crystal shall be denominated LC (Liquid Crystal).

The technical problem, solved by this invention, is the enlargement of the viewing angle, and the compensation of the angular dependence of the transmitted light intensity in the liquid crystal shutter elements respectively, either in autonomous elements in LCD (Liquid Crystal Display), or as components of optical apparatus comprising liquid crystal filters. More precisely, there is involved the compensation of LC optical light shutters, which function on the principle of electrically controlled birefringence, and are employed for modulating the intensity of the incident light in protective/safety devices, such as LCD protective filters in welding helmets, in optical systems of laser welding devices, and the like. The present invention enables the angular compensation of such a shutter in a typically closed state, in which the liquid crystal molecules are homeotropically aligned. This invention solves the problem of manufacturing a negatively birefringent compensation layer, which has the optical angle oriented perpendicularly with respect to the surface of the optical light shutter, that is parallel to the homeotropically oriented molecules, as well as the construction and the manufacture of a LC electro-optical shutter element, utilizing such a compensation layer.

The basic principles and natural laws, applied in the claimed process for the angular compensation of LC light shutters, which is the object of the present invention, are well-known and disclosed in several patents, such as Clerc et al. U.S. Pat. No. 4,001,028; Yamamoto et al. U.S. Pat. No. 4,984,874; Bos U.S. Pat. No. 5,187,603 and the like. Hitherto, there have been developed several successful technical solutions for the manufacture of compensation layers for LCD optical shutters.

The first successful solution (#1) of the above mentioned technical problem was disclosed in 1989 by Uchida of the Tohoku University (Uchida et al. SID 89 Digest, p 378–381), and in 1991 by Clerc of the Stanley company (SID Digest 91 p 758–761; U.S. Pat. No. 4,889,412; U.S. Pat. No. 5,298,199). Both solutions were based on the two-dimensional mechanical deformation or stretching respectively, of certain thermoplastic polymer materials during the thermal cycling through the glass phase transition. A few years later, a functionally similar result was achieved by Eblen et al. from the Rockwell Company (SID 94 Digest p 245–248; U.S. Pat. No. 5,196,953) with the use of multi-layer thin-film oxide filters exhibiting negatively birefrigent properties.

A new, technically highly interesting approach (#2) was developed by Harris and Cheng at the Akron University, USA, and somewhat later by Shin-Tson-Wu from the Hughes company, USA (J. Appl. Phys. 76, 10, 1994; SID Digest 94, p 923–926; U.S. Pat. No. 5,344,916; U.S. Pat. No. 5,580,950; U.S. Pat. No. 5,480,964). They disclosed that by means of centrifugal deposition of a thin layer of preimidized polyimides the long molecular segments were preferably oriented in the plane of the deposited layer, resulting in strong negatively birefringent properties of such layers, which represent an inexpensive and technically relatively simple solution of the above described technical problem.

By all means, there also merit attention several technical solutions developed for computer terminals (#3) in companies, such as Nito Denko (Fujimura et al. SID Digest 91, p. 739, SID Digest 92, p 397–400; U.S. Pat. No. 5,245,456, ... ), Sumitomo (Nakamura et al. U.S. Pat. No. 5,061,042, ... ) and (#4) Fuji Film (Mori et al., U.S. Pat. No. 5,559,618; Mori et al., Display and Imaging 5, p 1 (96); Kamata et al., U.S. Pat. No. 5,646,703; Mori et al. U.S. Pat. No. 5,583,679) and Akzo Nobel (Picken et al. U.S. Pat. No. 5,382,648; U.S. Pat. No. 5,525,265, ... ). The companies Nito and Sumitomo (#3) developed a multi-layer compensation film based on a one-dimensional deformation or stretching respectively; the Fuji company (#4) developed a polymeric discotic liquid crystal compensation sheet, the optical compensation properties of which could be altered with respect to the viewing/observation angle of the computer monitor; the Akzo Nobel company (#4) developed polymeric holesteric liquid crystal compensation films on various polymers, which were ideally adapted for the angular compensation of STN computer monitors. All above-mentioned solutions are primarily intended for the angular compensation of the contrast in multi-plexially monitored LC monitors, in which the homeotropic orientation of the LC molecules in the selected pixel is not entirely feasible. For this reason, such solutions are neither technically nor economically appropriate for the above-mentioned technical problem, that is the angular compensation of LC optical light shutters, operating on the principle of electrically controlled birefringence, in a the state with highly homeotropically aligned LC molecules.

Interesting are also techniques for solving the above represented technical problem of angular compensation of LC optical light shutters, operating on the principle of electrically controlled birefringence, which are devised to utilize a plurality of liquid crystal cells (#5). Technical solutions based on the complementary orientation of two standard TN cells (Twist Nematic—the rotation of the LC structure being 90.degree.) adapted in such a manner, that their angular dependences compensate each other, are used in manufacture by the majority of manufacturers (Optrel, Xelux, Jackson, ... ) The technical solution of the ESAB company (Hornell, U.S. Pat. No. 4,240,709) is important as well; it employs two TN cells, one of which is functioning in the passive mode (a substantially reduced angular dependence of the contrast), and the other in the active mode. In the >>passive<<TN cell there is used a twist angle of the LC cell of 60.degree.–90.degree. The Speedglass company claims in the patent (Hornel et al., EP 706,674, WO 9,529, 428, U.S. Pat. No. 5,825,441) the use of two complementary TN cells, characterized by a rotation of the LC structures of less than 90.degree.; in patent applications (Hornel et al., EP 805,661, WO 9,715,254) and (Hornel et al., EP 858,305, WO 9,715,255) the same company amends its basic idea of exploiting two complementary TN cells, using a LC structure rotation of less than 90.degree., with the aid of the low-frequency control of LCD shutters, and an additional retardation layer. With the utilization of several LC cells the angular compensation problem is solved also in U.S. Pat. No. 5,515,186 (Fergasson et al.). The compensation of the angular dependence in such a mode is, however, relatively expensive, as each additional LC cell substantially increases the manufacturing costs of the light shutters.

It has to be recognized as well, that the problem of the angular compensation of the layers of homeotropically oriented LC molecules is directly correlated with the problem of the angular dependence of the crossed polarizers per se, which are the subcomponent of each LC electro-optical shutter element, operating on the principle of electrically controlled optical birefrigence. In recent years, several authors have disclosed basic principles for the solution of this problem. The suggested solutions are based on the utilization of at least two additional birefringent layers sandwiched between the LC cell, and the input and output polarizers. K. Ohmuro et al., Fujitsu company, Japan, (SID'97, 1, p 845) show that the problem is quite successfully solvable by the utilization of three birefringent layers, two of which are negatively birefringent, and have a fast optical axis oriented perpendicularly to the liquid crystal layer plane (parallel to the homeotropically oriented LC molecules), and one of which is positively birefringent and has the optical axis oriented parallel to the liquid crystal layer plane (perpendicularly to the homeotropically oriented LC molecules!). The majority of other authors, such as H. Mori, P. Bos (IDRC'97, p M-88), J. Chen et al., Samsung company, Korea (SID'98 Digest, p 315), devise their technical solutions on the utilization of effectively two additional negatively birefringent layers, one of which has the fast axis parallel to the polarization axis of the analyzer, and causes a relative phase delay between the ordinary and the extraordinary rays for ¼ of the light wavelength, and is denominated λ/4 plate. The combination of such a λ/4 plate, oriented in the above manner, with a correspondingly thick additional birefringent plate exhibiting an optical birefringence with the same sign, and an optical axis oriented in perpendicular direction with respect to the liquid crystal layer, that is parallel to the homeotropically oriented LC molecules, significantly improves the angular dependence of the light attenuation in crossed polarizers.

Although there is a slight similarity with respect to the deformation of the otherwise isotropic polymeric molecules, the claimed technical solution differs significantly from the hitherto optimal state of the art solutions:

Solution #1 Group: Uchida, Stanley, . . .
Solution #2 Group: Harris and Cheng, Hughes, . . .
Solution #3 Group: NITO Denko, Sumitomo Chemicals . . .

in the procedure applied to achieve the corresponding deformation of the polymer molecules.

Uchida, Stanley (#1) and Nito as well as Sumitomo Chemicals (#3) employ the principle of two or one-dimensional stretching of a preformed, that is a polymerized thermoplastic polymeric sheet. On the other hand, Harris and Cheng and Hughes (#2) utilize the method of alignment of long molecular segments by means of a specific method of deposition of a prepolymerized polymer solution, such as the deposition of a preimidized polyimide on a rotating plate.

The present invention is based on the utilization of the volume contraction of the polymer during the very polymerization process, so that the monomer layer is during the polymerization in contact with the surface of at least one rigid flat plate, or is preferably sandwiched between two layers of thermally and mechanically stable, rigid materials, for example glass. In such a manner, strains are generated in the material in the plane, determined by the rigid boundary surfaces, and causing the corresponding deformation of otherwise isotropic macromolecules. Since this deformation of the macromolecules is effected during the polymerization process, the cross-polymerization permanently freezes the molecules in their deformed state, which is of the utmost importance for the long-term and thermal stability of the birefringent films, manufactured in such a manner. The term "freezes" should be interpreted in the sense of "hardens" or "becomes rigid" respectively. The very deformation of the macromolecules effected with cross-polymerization, endows the present invention with substantial advantages in comparison with hitherto known methods of stretching preformed that is polymerized polymeric sheets. The latter has been achieved by hitherto known processes either by means of a direct, more or less one-dimensional mechanical stretching, of the type utilized in the above mentioned technical solution #3 Group (Nitto, Sumitomo, . . . ), or by means of a homogeneous, two-dimensional stretching of the thermoplastic polymeric sheet in the vicinity of the glass phase transition of the employed polymer, which is characteristic for the #1 Group of the above itemized known technical solutions—Uchida, Stanley, . . . . The claimed process does not require technically sophisticated equipment for the controlled mechanical stretching. It enables mass production, and furthermore, may be adapted in such a manner, that the obtained negatively birefringent polymer layer exerts simultaneously a bonding action, that is the adhesion and the optical contact between the LCD cell, and the polarizing filter.

The present invention enables, in comparison with the technical solutions #2 a substantially reduced deformation of the molecules, thus requiring thicker layers. The manufacturing process is, however, less expensive, more flexible and enables a significantly broader choice of the materials, as well as an improved precision and reproducibility. An important advantage is also the possible adaptation of the manufacturing process, enabling the simultaneous adjustment of the thickness of the compensating polymeric layer to the individual LCD optical shutters, that is the adjustment as to the thickness and birefringence of the liquid crystal layer, the chosen polarizer, etc. This is not feasible in any of the three prior art processes, which require either an extraordinary exacting one- or multi-dimensional stretching (technical solutions #1 and #3), or an extraordinary sophisticated method for the deposition of the compensating layer (technical solutions #2). Feasible is only the mass production of the compensation sheet exhibiting a determined selected retardation value, which is, however, not necessarily optimal for the selected configuration of the LCD optical shutter. The characteristics of the selected configuration are influenced primarily by the thickness and the refractive index of the liquid crystal layer, the selected polarizers, etc.

The present solution is completely different from the technical solutions #4 Group (Fuji, Akzo-Nobel, . . . ). The latter are indeed of high technical quality, the methods are, however, highly sophisticated and expensive. A mass production of a compensation layer with exactly defined characteristics is involved, which in principle impedes the adjustment to the specific characteristics of the individual LCD shutters. At the same time it has to be emphasised that such materials cannot be simultaneously utilized for the bonding of the individual subcomponents of the LCD shutter into a functional unity.

In comparison with hitherto known technical solutions, based on the utilization of several LC cells (#5), the claimed invention enables a significantly less expensive and simpler application of the present process. The employment of each supplementary LC cell renders in fact the product significantly more expensive; furthermore, other important optical characteristics, such as light scattering, are deteriorated.

The object of this invention is a process for manufacturing a polymeric optical compensation layer for LCD optical shutters, and the corresponding construction of such a shutter. The process ought to enable the manufacture of an optically negatively birefringent compensation layer, based on the controlled, spontaneous deformation of the polymeric macromolecules during the formation of the polymeric layer. The deformation of the polymeric macromolecules should result from the volume shrinkage of the polymer volume during the polymerization process, if the polymer layer is during the polymerization continually in contact with at least one rigid plate surface. Preferably, however, it is sandwiched between two rigid surfaces, under the provision, that the shrinkage of the polymer is unrestrained in the direction perpendicular to the surface plane. The expression "unrestrained" means, that it is in fact unrestrained, or that the mechanical strains in the direction perpendicular to the surface plane, are significantly reduced in comparison with the strains in the layer plane. The optically birefringent polymer compensation layer, manufactured in accordance with the present invention, ought to enable an easy adjustment to the specific characteristics of the individual LCD optical shutters, by means of adjusting the thickness of the layer per se, and the polymerization conditions.

In addition to the compensation of the angular dependence of the optical characteristics (light attenuation, . . . ) of the LCD optical shutter, the obtained optically negatively birefringent layer can also act simultaneously as an optical contact adhesive, combining the individual subcomponents of the LCD optical shutter into a functional unity.

According to this invention, the object is achieved in conformance with the appended claims.

In the text bellow, the invention is exemplified and illustrated with the aid of drawings, representing.

The solution suggested by this invention resides in the spontaneous deformation of the molecules of certain polymeric materials, such as polyurethanes, polycarbonates, various polymeric materials for plastic lenses, such as allyl-diglycol-carbonate (ADC), laminating materials for polarization films, such as cellulose-aceto-butyrate (CAB), and cellulose-triacetate (TAC) etc., materials respectively. The deformation is caused by the volume shrinkage of the material during the thermally and UV triggered polymerization, under the provision, that during the polymerization the monomer layer is in direct contact with at least one rigid plate surface, or is sandwiched between two layers of rigid, thermally and mechanically stable materials, such as glass.

Monomeric and prepolymeric materials, appropriate for this technical solution, are especially those that by virtue of their chemical structure, being already polymerized, during the linear stretching tend to become optically positively birefringent, having the main axis of the refractive index tensor, that is the optical axis, oriented in the direction of the mechanical deformation, that is the stretching.

Figure 1:
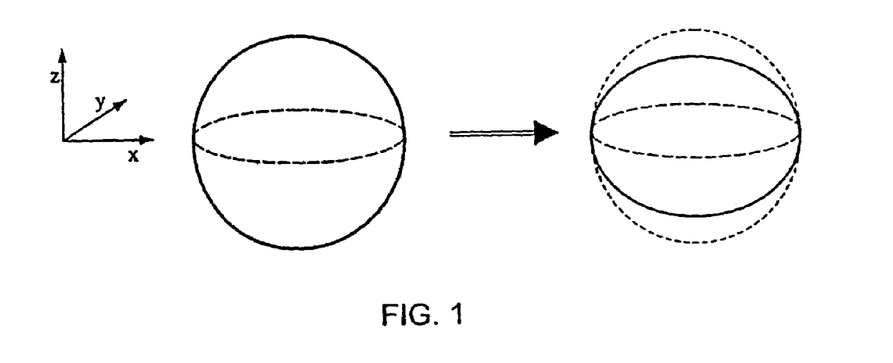
FIG. 1: a schematic depiction of a polymer macromolecule that is not deformed, and a macromolecule deformed according to the claimed process.

During polymerization the polymeric mass adheres to the boundary surface of the rigid plate. The spontaneous volume shrinkage of the polymer during the polymerization results in the generation of mechanical strains in the material. This enables the free shrinkage of the material in the direction perpendicular to the polymeric layer plane (in the thickness direction), that is the axis z, leaving only the strains on the polymer layer plane, which are the axes x, y; in the direction of the axis z, however, the mechanical strains are substantially diminished. These strains cause a deformation of the otherwise isotropic molecules of the polymer, to become flattened in the z axis direction, and they become uniformly stretched in all directions in the x, y plane of the polymeric layer, as represented in FIG. 1. The employment of materials exhibiting the above-mentioned positive stretching characteristics yields an optically negatively birefringent layer.

Triggering the polymerization at elevated temperatures can enhance the deformation of the macromolecules during the polymerization process. Thus the differences between the thermal stretching of the polymer and the rigid boundary surfaces increase the deformation of the macromolecules.

The selection of appropriate conditions for the technical procedure, especially the thickness of the layer, the chemical composition of the boundary plate surfaces, the polymerization time-velocity profile, etc., endows the obtained polymeric layer with desired optically negatively birefringent characteristics. These optical characteristics make possible the angular compensation of the intensity of the transmitted light for the homeotropically aligned LC molecular layer in the LC optical shutter, which generally shows an optically positive birefringence. The appropriate selection of the thickness of the compensation polymeric layer enables the compensation of the angular dependence of the contrast/attenuation of the LC shutter. Thus, the optical thickness of the compensation layer, which is the product of the birefringence ($\Delta n$) and the thickness of the layer (d)→($\Delta n_{polymer} \times d_{polymer}$), is equal to the optical thickness of the liquid crystal layer, that is the product of the birefringence and the thickness of the layer ($\Delta n_{LC} \times d_{LC}$).

Owing to the three-dimensional shrinkage during the polymerization, the complete process has to be performed in such a manner, that the strains are generated only in the x, y plane of the polymer compensation layer, while the strains in the z direction (in the thickness direction), perpendicular to the surface, have to be minimal. The strains in the direction of the z axis can be avoided by allowing the free variation of the thickness of the compensation layer, thus displacing at least one boundary layer in the direction of the z axis during the polymerization process.

This can be achieved in several ways, in conformance with three basic ideas:

With the utilization of soft spacers, easily deformable under pressure, between the boundary surfaces of the polymeric compensation layer, by means of which the thickness of the prepolymer layer is adjusted prior to the polymerization, and simultaneously easily deformed by the action of forces generated by the shrinkage of the material during the polymerization, thus enabling a free shrinkage in the direction of the z axis.

By means of a gradual or multi-stage, preferably two-stage polymerization, wherein the thickness of the layer between two rigid boundary surfaces of the polymer mass (monomer and prepolymer respectively), is at the beginning adjusted by hard spacers, and the polymerization proceeds to the point only, at which due to the viscosity and the surface activity the leakage of the polymer mass is no longer possible. Then the rigid spacers ensuring the corresponding thickness of the polymer layer are removed, and the polymerization process is completed in such a manner, that it enables the unrestrained shrinkage of the polymer in the z direction perpendicular to the layer plane.

By pouring an appropriate prepolymer layer of controlled thickness on a rigid support thus enabling the unrestrained shrinkage of the thickness of the polymer layer in the z axis direction. The process for the polymerization of the prepolymer mass proceeds in contact with at least one boundary surface.

The following Examples are working embodiments, describing the process for manufacturing a polymer layer exhibiting an optically negative birefringence, as well as the construction of the LC optical shutter per se, with the utilization of such a polymer layer for the compensation of the angular dependence of the light attenuation.

EXAMPLE 1

Figure 2:
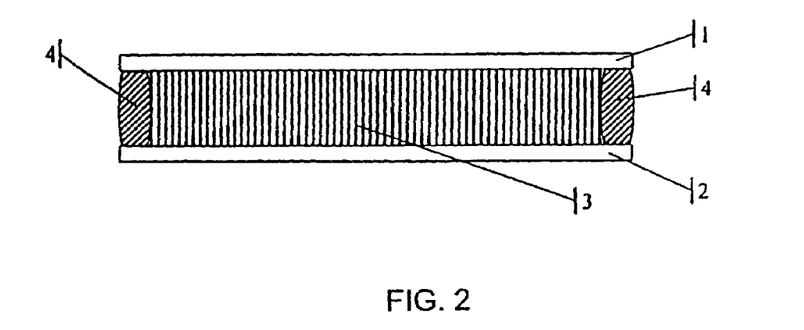
FIG. 2: a schematic illustration of the process for manufacturing an optically negatively birefringent polymer layer by the employment of soft spacers.

A. Process for the Manufacture of an Optically Negatively Birefringent Polymer Layer a) Single-Stage Polymerization—Soft Spacers A polymeric, negatively birefringent compensation layer is formed between two rigid boundary surfaces as represented in FIG. 2. The spacing between the boundary surfaces 1,2, preferably glass plates having a mutual distance equal to the thickness d, is filled up with the monomer or prepolymer mass 3 respectively. Appropriate are monomeric or prepolymeric materials, which by virtue of their chemical structure, already in their polymerized form tend to become optically positively birefringent during linear stretching, having the main axis of the refractive index tensor, that is the optical axis, oriented in the direction of the mechanical stretching, for example a polyurethane-epoxy copolymer with a UV light activator. The spacing between the surfaces or the prepolymer layer thickness respectively, is determined by means of the spacers 4, the so-called soft spacers, manufactured in a separate process from an appropriate material, for example a silicone gel having appropriate dimensions and such a hardness as to remain undeformed at pressures resulting from the weight of the boundary plate having the surface 1, as well as the surface tension in the non-polymerized material layer.

The layer is heated to an elevated temperature, for example 60° C. to 80° C., and the resulting thermal expansion causes an additional increase of the strains, which are responsible for the deformation of the polymer macromolecules. An intensive, highly homogeneous UV light emitted preferably by a 300–1000 W light source, predominantly in the UV spectral domain, is employed to trigger the polymerization of the prepolymer mass layer 3 in FIG. 2, which is terminated in an appropriate period of time. During the very polymerization procedure the temperature of the polymeric layer may begin to decrease, so that the final cross-linking, that is the cross-polymerization, can take place in a more or less cool material. In the course of the polymerization, the volume shrinkage of the polymeric layer results in the generation of strains within the layer. The exertion of these forces causes the deformation of the soft spacers 4, and enables the unrestricted shrinkage of the polymer layer 3 in the direction perpendicular to the layer plane or in the direction of the z axis respectively, while the strains in the plane of the x,y axes remain, owing to the adhesion on the surfaces of the rigid boundary plates 1,2. The polymer macromolecules thus acquire the typical deformation, as depicted in FIG. 1. The cross-polymerization permanently >>freezes<< the molecules in their deformed state; this is of the utmost importance for a long-term and thermal stability of the birefringent polymeric films obtained in such a manner.

The expression "freezes" is employed in the meaning of "hardens" or "becomes rigid" respectively. After the polymerization the rigid boundary plates are optionally removed. The obtained optically negatively birefringent polymer layer may be utilized as an autonomous optically negatively birefringent element in various applications. In superior articles, for example in protecting welding filters, which are predominantly multi-layer laminates made of different layers, such as infrared light reflectors, polarization filters, and the like, the boundary layers may be provided by the individual elements of such optical assembly, and the above-described polymeric layer acts supplementary to the optical angular compensation of the homeotropically oriented LC molecules simultaneously as a bonding layer and as an optical contact.

b) Two-Stage Polymerization—Hard Spacers

Figure 3:
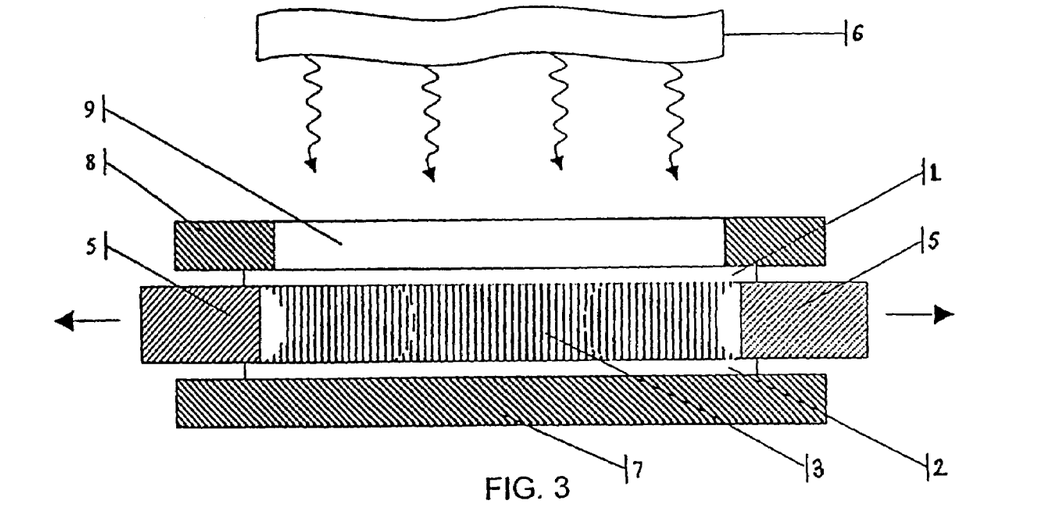
FIG. 3: a schematic illustration of the process for manufacturing an optically negatively birefringent polymer layer by employing a two-stage polymerization of the polymeric compensation layer, and hard spacers, which are removed prior to the second polymerization stage.

The process is initiated as in Example a), except that the spacing between the plates having the surfaces 1,2, is determined by the hard spacers 5 in FIG. 3; in conjunction with the aperture 9 in the upper support 8 it enables the illumination of the prepolymer layer 3 with UV light. The polymerization is operated in two stages. The first polymerization stage is preferably activated at room temperature by means of a relatively weak UV light, advantageously provided by a 150 W light source 6 in the UV A spectral domain. The total visible area of the prepolymer mass layer 3 is illuminated as homogeneously as possible, and the illumination is interrupted immediately or within a few seconds after the viscosity reaches the level, at which it impedes in conjunction with the surface tension the leakage of the partially polymerized mass.

The termination of the first stage of the partial polymerization is followed by the removal of the hard spacers 5 ensuring the proper thickness of the polymer layer. Identically as in Example a), the layer is subsequently in the second stage, optionally thermally or by UV activation, heated to an elevated temperature, preferably 60° C. to 80° C. to enhance additionally by thermal stretching the strains responsible for the deformation of the polymer macromolecules. The intense, highly homogeneous UV light, which is preferably provided by a 300–1000 W light source predominantly in the UV A spectral domain, triggers the process of the final polymerization of the prepolymer mass that is accomplished in some ten seconds. During the very polymerization process the temperature of the polymer layer may begin to decrease, so that the final cross-linking occurs in the more or less cool material. The cross-polymerization permanently freezes the molecules in the deformed state, which is of the utmost importance for a long-term and thermal stability of the birefringent polymer films manufactured in such a manner. Identically as in Example a), the rigid boundary plates are optionally removed, and the obtained optically negatively birefringent polymer layer may be utilized as an autonomous, optically negatively birefringent element in various applications. In superior articles, for example in protective welding filters, which are predominantly multi-layer laminates made of different layers, such as infrared light reflectors, polarization films and the like, the boundary layers may be provided by the individual elements of such an optical assembly. The above-described polymer layer functions as an optical angular compensation layer for the homeotropically oriented LC molecules, as well as simultaneously as a bonding layer and an optical contact.

Optionally the polymer mass is in the first stage illuminated at the margins only of the polymer layers, outside the usable, namely is the viewing area of the later optically negatively birefringent compensation layer. The polymerization or the illumination with UV light respectively, is interrupted as soon as the hardness of the material in the illuminated region increases to the point, at which the polymerized areas function as soft spacers.

The processes for the manufacture of the polymer compensation layer for LC optical shutters having the optical axis perpendicular to its surface plane, are characterized in:

that the monomer or prepolymer mass is poured on a rigid boundary surface, and the polymerization of the prepolymer mass proceeds in contact with at least one rigid boundary surface;

that the monomer or prepolymer mass is poured between two rigid boundary surfaces separated by soft spacers, which are deformed under pressure, in such a way that the polymerization of the prepolymer proceeds in contact with the two rigid boundary surfaces;

that the monomer or prepolymer mass is poured between the two rigid surfaces divided by hard spacers, and the polymerization of the prepolymer mass in contact with the two rigid boundary surfaces proceeds at first only to the level, at which the viscosity of the mass is increased to the point at which it does not leak out, whereupon the hard spacers are removed and the polymerization process proceeds to the end.

The expression "poured" is to be understood in the broadest interpretation, which means that there may in fact be poured on a rigid boundary surface, or sandwiched, with the aid of the surface tension effect, between two rigid boundary surfaces, or poured on one rigid boundary surface, and the other rigid boundary surface is applied to the layer after the pouring.

The polymerization process is either thermally or UV activated, and is operated at elevated temperature, which is at least somewhat lower than the glass phase transition of the polymer. In most cases the attained optical birefringence of the polymer layer may be optionally decreased in a suitable, controlled way, by means of reheating the polymer layer in the vicinity of the glass phase transition of the polymer. The polymerization is at least at the beginning activated by means of UV light. The activation with the UV light 6 proceeds optionally in two stages, so that in the first stage, when the thickness of the layer is determined by the hard spacers 5, it proceeds to the level only, at which the increased viscosity stabilizes the thickness of the layer 3 to the point at which the hard spacers are removable, and so the next phase of the UV-activation enables the operation of the polymerization without the generation of strains in the direction perpendicular to the compensation layer 3.

B. The Construction of an Angularly Compensated LCD Optical Shutter

The process for manufacturing an optically negatively birefringent layer according to this invention enables an entirely novel constructional solution of manufacturing angularly compensated optical LC light shutters. Such a layer performs the basic function of compensating for the angular dependence of the optically positive birefringence of the homeotropically oriented layer of the liquid crystal, as well as the bonding of the subcomponents into a mechanically and optically uniform assembly, and further ensures the optical contact, which is not feasible by any of the prior art technical solutions.

The construction according to this invention is performed in such a manner, that one or both polarizers, which in conjunction with the LC cell form the optical shutter, are not directly laminated to the LC cell, but to one of the outer protecting layers, for example to a glass or IR/UV filter, and subsequently, by means of the optically negatively birefringent polymer layer combined according to the invention with the LC cell into a mechanically and optically uniform assembly.

In general, two concepts for the optical compensation of the LC light shutters are involved.

a. The compensation of the angular dependence of the optically positive birefringence in a homeotropically oriented LC layer in a LC cell.

b. The compensation of the angular dependence of the optionally positive birefringence in a homeotropically oriented LC layer in a LC cell, as well as the angular dependence of polarizers crossed perpendicularly to each other and forming in conjunction with the LC cell an LC optical shutter.

Figure 4A:
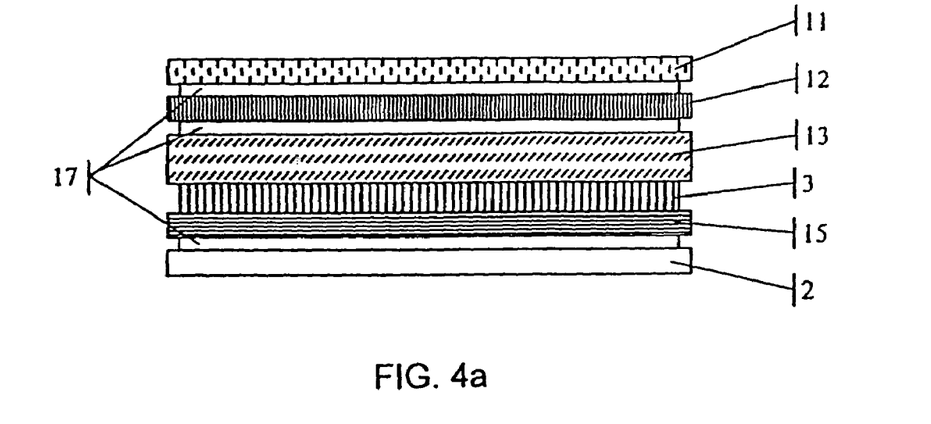
FIG. 4: a schematic representation of the construction of an angularly compensated LC optical shutter, enabling the angular compensation of the birefringence of the LC layer:
  a—exemplifying mechanically stable polarizers;
  b—exemplifying an additional glass plate, protecting the mechanically sensitive polarizers.

Ad a. In most cases, the compensating for the angular dependence of the optically positively birefringence of the homeotropically oriented liquid crystal layer in the LC cell 13, fulfils the technical requirements in a completely sufficient manner, and thus the construction of such a LC optical shutter represented in FIG. 4, is simplified. Inasmuch as the outer layers of the polarization film may withstand the mechanical pressure in the x,y plane of the polarization filter, generated during the above-described polymerization process (according to the working Examples Aa and Ab) of the optically negatively birefringent layer 3, the preferred and most appropriate construction is at first the bonding, by means of a standard isotropic adhesive 17, of the polarizer 15 with one of the outer protective layers corresponding to the boundary surfaces 2, such as glass, and a LC cell 13, the polarizer/analyzer 12 and the IR/UV reflector 11, to yield two autonomous assemblies. The obtained components of the LC shutter are combined in accordance with the above-described process into a unity by means of bonding with an appropriate polymer layer 3, such as a polyurethane-epoxy copolymer with an UV light activator. Such a construction of the optical shutter is represented in FIG. 4a.

The conditions in the manufacture of the shutter should be strictly controlled, in conformance with the described process of manufacturing the optically negatively birefringent polymer layer, in respect of the working Examples Aa and Ab, as well as in respect of the mechanical construction, which has to secure a strictly defined and controlled thickness of the layer, for example 300 µm, as well as the polymerization conditions: temperature profile, UV light illumination procedure, so that the optically negative birefringence is induced in the polymer layer 3 during the polymerization. The appropriate performance of the whole process, that is with soft spacers or the multi-stage polymerization enables the perpendicular orientation of the principal axis of the refractive index tensor with respect to the layer. If simultaneously its optical thickness is such, that the integral optical thickness, that is the multiplication product of the birefringence and the thickness of the layer ($\Delta n_{polymer} \times d_{polymer}$), of this layer and the optical thickness of the two polarization filters, which themselves exhibit slightly optically negatively birefringent characteristics, is equal to the optical thickness of the homeotropically oriented liquid crystal layer, that is the multiplication product of the birefringence and the thickness of the layer ($\Delta n_{LC} \times d_{LC}$), the requirement for the compensation of the angular dependence of the contrast/attenuation of the LC shutter is fulfilled. In addition to this basic function the layer also combines the two subcomponents into a mechanically and optically uniform assembly, and ensures the optical contact.

Figure 4B:
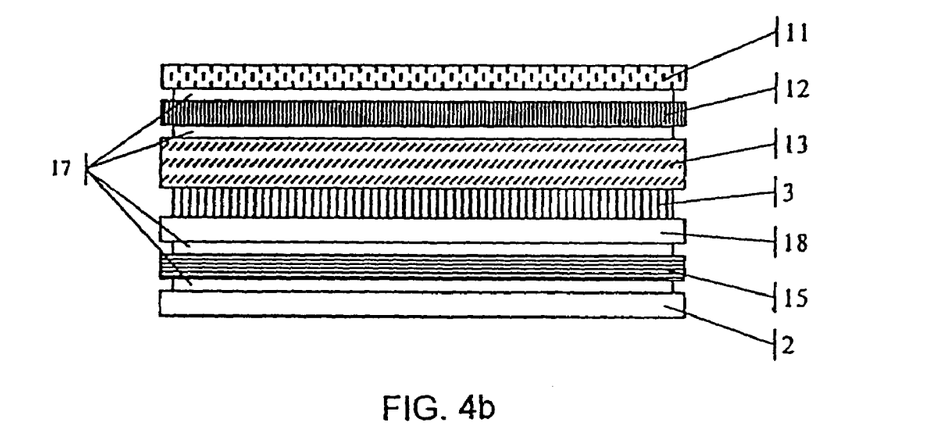

If the outer layers of the polarization filters do not withstand the mechanical pressure in the x-y plane of the polarization filter, generated during the above-described polymerization of the optically negatively birefringent layer, the preferred and most suitable construction is represented in FIG. 4b. In this case the optically negatively birefringent compensation polymer layer 3 is formed between one of the surfaces of the LC cell 13, and an additional, preferably glass plate 18, which is an effective protection for the polarizer/analyzer 15. This manufactured assembly consisting of the LC cell 13 and the optically negatively birefringent polymer layer 3, sandwiched between one of the outer glasses of the LC cell 13 and the additional, preferably glass plate 18, is laminated on both outer surfaces with the crossed polarizers 12 and 15 by means of a standard isotropic adhesive 17, such as a silicone gel and the like. This optical shutter exhibits significantly improved characteristics in comparison with a standard LC optical shutter.

It is understood, that it is optionally possible to combine the two polarizers with the LC cell by means of the optically negatively birefringent polymer compensation layer in conformance with the invention, instead of the standard optically isotropic adhesive. In this case, however, the sum of the optical thicknesses of the two polymer layers and the optical thickness of the two polarization filters, which themselves exhibit slightly optically negatively birefringent characteristics, has to be equal to the optical thickness of the homeotropically oriented liquid crystal layer, that is the multiplication product of the birefringence and the thickness of the layer ($\Delta n_{LC} \times d_{LC}$); the requirement for the compensation of the angular dependence of the contrast/attenuation of the LC shutter is thus fulfilled.

Figure 5:
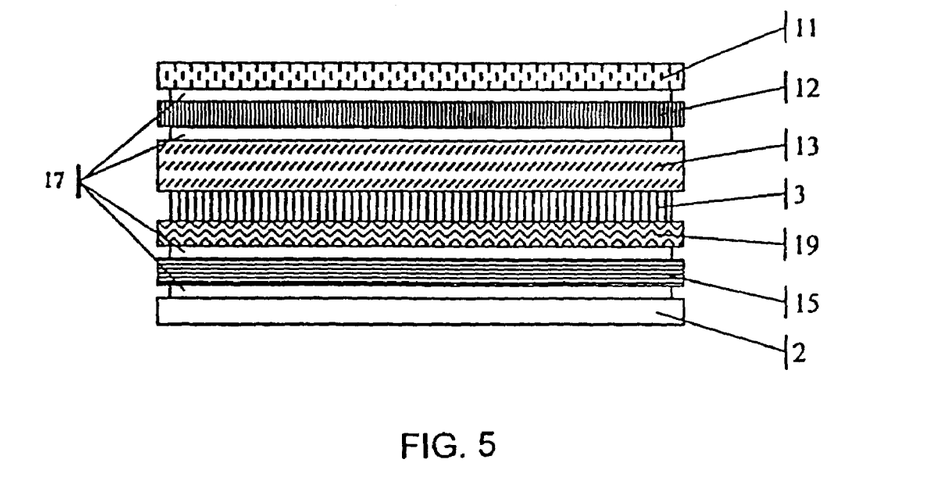
FIG. 5: a schematic representation of the construction of an angularly compensated LC optical shutter, enabling the angular compensation of the birefringence of the LC layer, and the crossed polarizers.

Ad b. The constructions of the angularly compensated LC optical shutter, described in the working Example a), solve exclusively the problem of the angle-dependent birefringence of the layers of homeotropically oriented LC molecules. They do not, however, solve the problem of the angular dependence of the crossed polarizers themselves, which are the components of any LC electro-optical shutter element operating on the principle of electrically controlled optical birefringence. The utilization of an optically negatively birefringent layer, that is the object of the claimed invention, enables the optimal constructional embodiment, and at the same time ensures the angular compensation of the birefringence of the homeotropically oriented LC molecules, as well as the compensation of the angular compensation of the crossed polarizers with the use of an additional $\lambda/4$ plate. Since the optical retardation layers are significantly dependent on the wavelenght of the light, is an ideal example for the utilization of the above-mentioned angular compensation principle the protective welding filter requiring for the supplementary eye protection from UV and IR light, an additional filter for the yellow-green light of the wavelenght approximately 550 nm. FIG. 5 depicts the construction of such a shutter, which is a multi-layer laminate. It is composed of: a thin-layer IR/UV filter 11 that at the same time ensures the protection from the harming IR and UV light, as well as the selective transmittance of the light having a wavelenght of 550 nm, corresponding to the $\lambda/4$ plate, of two crossed polarizers 12, 15, and a LC cell 13 in the closed state with homeotropically oriented molecules, exhibiting an optical birefringence $\Delta n_{LC}$ and having a thickness $d_{LC}$, a polymer layer 3 of a thickness (L) exhibiting an optically negative birefringence $\Delta n_L$ and having an optical axis directed perpendicularly to the layer itself, a $\lambda/4$ plate 19 for the light of a wavelenght of 550 nm, exhibiting an optically positive optical birefringence, the slow axis of which is parallel to the polarization transmission axis of the polarizer/analyzer 15 and the protective glass surface 2. The basic idea is, that the optical thickness ($\Delta n_1 \times l$) of the optically negatively birefringent polymer layer 3 in this case does not adapt directly to the optical thickness of the liquid crystal layer, as in the working Example Ba. In this case it has to be secured, that the thickness (L) of the optically negatively birefringent layer 3 of the optical adhesive layer in conjunction with the negative birefringence of the two polarizers is such, that the difference of the refractive indices for the ordinary and the extraordinary rays ($\Delta n_L$) is such, that the difference of the optical paths for the ordinary and the extraordinary rays ($\Delta n_L \times L$) is smaller than the difference of the optical paths for the ordinary and the extraordinary rays in the LC cell 13 with homeotropically oriented molecules ($\Delta n_{LC} \times d_{LC}$). In such a way the optically uncompensated part of the LC layer 13 operates as an optically positively birefringent plate, the optical axis of which is perpendicular to the axis of the $\lambda/4$ plate 19, while the difference of the optical paths in this part of the layer is such that together with the $\lambda/4$ plate 19 it ensures the angular compensation of the two polarizers 12,15 of the LC light shutter.

The preferred constructions are as follows:

At least one of the polarizers 12,15 is laminated with an isotropic contact adhesive to the outside protective plate 2 of the light shutter instead of directly to the LC cell, so that there is a polymer layer 3 between at least one of the polarizers 12,15, and between at least one of the boundary surfaces of the LC shutter. According to this invention, the polymerization is performed in such a manner that the polymer performs the function of combining the subcomponents of the LC shutter into a functional unity, while at the same time ensuring the angular compensation of the LC shutter in the state, in which the molecules are homeotropically oriented with respect to the boundary surfaces of the LC shutter.

The optically negatively birefringent polymer layer 3 is deposited on one of the boundary surfaces of the LC cell 3, so that said polymer layer is sandwiched between the surface of the LC cell 13 and the rigid transparent, preferably glass plate 18. Two crossed polarizers 12, 15 are laminated with an isotropic optical adhesive 17 on each of the boundary surfaces of such assembly, and the protective outer glass plate 2 and an IR/UV filter 11 are laminated to these polarizers by means of an isotropic optical adhesive 17 as well.

The construction of a LC light shutter with the use of an optically negatively birefringent polymer adhesive layer 3, optionally comprising an additional optically negatively birefringent layer between the polarizer and the LC cell. The thickness of the layer 3 corresponds to the requirement for the λ/4 plate 19, the slow axis of which is parallel to the polarization (transmittance) axis of the polarizer/analyzer 15, wherein the thickness (L) of the optically negatively birefringent polymer adhesive layer 3 is such, that the difference between the refractive indices for the ordinary and the extraordinary rays ($\Delta n$) is such, that the difference of the optical paths for the ordinary and the extraordinary rays ($\Delta n_L \times L$) is smaller than the difference of the optical paths for the ordinary and the extraordinary rays in the LC cell with homeotropically oriented molecules ($\Delta n_{LC} \times d_{LC}$). Thus the optically negatively birefringent polymer adhesive layer 3, the optically negative birefringence of the polarizer 12, and the optically uncompensated part of the LC layer in the LC cell 13 operate as a optically positively birefringent plate, the optical axis of which is perpendicular to the axis of the λ/4 plate 19, while the difference of the optical paths in this part of the layer is such that in conjunction with the λ/4 plate 19 it ensures the angular compensation of the two crossed polarizers in the LC light shutter.

The construction of a LC light shutter with the use of an optically negatively birefringent polymer adhesive layer 3, and as alternative optionally an additional optically negatively birefringent layer sandwiched between the polarizer and the LC cell, the thickness of which corresponds to the requirement for the λ/4 plate 19, the fast axis of which is parallel to the polarization axis of the polarizer/analyzer 15. The thickness (L) of the optically negatively birefringent polymer adhesive layer 3 is such, that the difference of the optical paths for the ordinary and the extraordinary rays ($\Delta n_L \times L$) is greater than the difference of the optical paths for the ordinary and the extraordinary rays in the LC cell 13 with homeotropically oriented molecules ($\Delta n_{LC} \times d_{LC}$), in such a manner that with the LC layer and the optically negative birefringence of the polarizer 12, the optically uncompensated part of the optically negatively birefringent polymer adhesive layer 3 operates as an optically negatively birefringent plate, the optical axis of which is perpendicular to the axis of the λ/4 plate 19, while the difference of the optical paths in this part of the layer is such that in conjunction with the λ/4 plate 19 it ensures the angular compensation of the crossed polarizers 12,15 in the LC light shutter.

It should be emphasized, that the described Examples represent only a few feasible working embodiments of the claimed invention. Various modifications and variations can be made within the scope of this invention, such as the utilization of a λ/4 plate exhibiting an optically negative birefringence, the employment of an additional glass plate, which mechanically separates/protects the polarizer and the λ/4 plate respectively, from the optically negatively birefringent polymer compensation layer, and the like.

The invention claimed is:

1. A process for manufacturing an optical negative birefringent layer consisting of a monomer material or a prepolymer material and having an optical axis perpendicular to a surface thereof, said process comprising
   (1) pouring the monomer material or the prepolymer material
      (a) over a rigid substrate surface,
      (b) between two rigid substrate surfaces separated by deformable spacers, or
      (c) between two rigid substrate surfaces separated by non-deformable spacers,
   to form a material layer;
   (2) polymerizing said material layer at an elevated temperature which is lower than a glass phase transition temperature of the polymerized monomer material or the prepolymer material, such that for
      (a) or (b) said material layer is fully cured,
      and for (c) said material layer polymerizes at room temperature to a first level at which viscosity of the monomer material or the prepolymer material is increased to a point that the monomer material or the prepolymer material does not leak out from between the substrate surfaces, followed by removal of the non-deformable spacers, and completion of the polymerizing at said elevated temperature,
   so that for (a), (b) and (c) the material layer unrestrainably shrinks in a direction perpendicular to the substrate surface or the substrate surfaces, wherein said polymerizing of said material layer is conducted in such a manner to provide a spontaneous deformation of molecules forming the monomer material or the prepolymer material, which is induced by an anisotropic mechanical strain due to shrinking the material layer in contact with and parallel to the substrate surface or the substrate surfaces, which is permanently frozen-in by cross-linking polymerization and results in strain-induced negative birefringent properties in the material layer; and
      (3) cooling said material layer following said polymerizing to room temperature.

2. Process according to claim 1, wherein said polymerizing is thermally activated at the elevated temperature which is lower than said glass phase transition temperature, and optical birefringence is reduced by reheating the material layer polymerized to a temperature approximately equal to a glass phase transition temperature of the polymerized material.

3. Process according to claim 1, wherein said polymerizing is activated at least initially by UV light.

4. Process according to claim 1, wherein activation of said polymerizing is by UV light and said pouring of said monomer material or said prepolymer material is in accordance with (c), said activation by said UV light comprising a first stage and a second stage wherein the first stage is to a level allowing removal of the non-deformable spacers, and the second stage is to completion substantially in absence of mechanical strains in a direction perpendicular to the material layer polymerized.

5. A process for manufacturing an optical negative birefringent layer which is an Optical Compensation layer (OCL) for angular compensation of phase retardation of a transmitted light through a liquid crystal layer (LCL) and two polarization filters, said OCL consisting of a monomer material or a prepolymer material and having an optical axis perpendicular to a surface thereof, with said OCL and said LCL having an optical thickness which is a product of birefringence ($\Delta n_{OCL}$, $\Delta n_{LCL}$) and thickness of the layer ($d_{LCL}$, $d_{OCL}$) respectively, and said two polarization filters having an optical thickness ($p_1$, $p_2$), respectively, said process comprising
   (1) pouring a predefined mass of the monomer material or the prepolymer material
      (a) over a rigid substrate surface,
      (b) between two rigid substrate surfaces separated by deformable spacers, or
      (c) between two rigid substrate surfaces separated by non-deformable spacers, to form a material layer;

(2) polymerizing said material layer at an elevated temperature which is lower than a glass phase transition temperature of the monomer material or polymerized the prepolymer material, such that for (a) or (b) said material layer is fully cured, and for (c) said material layer polymerizes at room temperature to a first level at which viscosity of the monomer material or the prepolymer material is increased to a point that the monomer material or the prepolymer material does not leak out from between the substrate surfaces, followed by removal of the non-deformable spacers, and completion of the polymerization at said elevated temperature, so that for (a), (b) and (c) the material layer unrestrainably shrinks in a direction perpendicular to the substrate surface or the substrate surfaces; wherein said polymerizing of said material layer is conducted in such a manner to provide spontaneous deformation of molecules forming the monomer material or the prepolymer material, which is induced by an anisotropic mechanical strain due to shrinking the material layer in contact with and parallel to the substrate surface or the substrate surfaces, which is permanently frozen-in by cross-linking polymerization and results in strain-induced negative birefringent properties in the material layer; and (3) cooling said material layer following said polymerizing to room temperature; wherein mass of said monomer material or the prepolymer material and thus thickness of the OCL ($d_{OCL}$) is selected, such that a sum of optical thicknesses of a fully cured OCL and the two polarization filters equals optical thickness of the LCL $(\Delta n_{OCL} \times d_{OCL}) + p_1 + p_2 = (\Delta n_{LCL} \times d_{LCL})$.

* * * * *

UNITED STATES PATENT AND TRADEMARK OFFICE
CERTIFICATE OF CORRECTION

| | | |
|---|---|---|
| PATENT NO. | : 7,132,133 B1 | Page 1 of 1 |
| APPLICATION NO. | : 10/018049 | |
| DATED | : November 7, 2006 | |
| INVENTOR(S) | : Janez Pirš et al. | |

It is certified that error appears in the above-identified patent and that said Letters Patent is hereby corrected as shown below:

<u>Column 14,</u>

Line 5, Claim 1 "the prepolymer material," should read

-- the polymerized prepolymer material, --.

<u>Column 15,</u>

Lines 4-5, Claim 1 "of the monomer material or polymerized the prepolymer material," should read -- of the polymerized monomer material or the polymerized prepolymer material, --.

Signed and Sealed this

Seventh Day of October, 2008

JON W. DUDAS
*Director of the United States Patent and Trademark Office*